(12) United States Patent
Hayakawa (10) Patent No.: US 6,374,057 B1
(45) Date of Patent: Apr. 16, 2002

(54) DATA IMPRINTING SYSTEM FOR CAMERA

(75) Inventor: Masahiro Hayakawa, Kanagawa-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/648,447

(22) Filed: Aug. 28, 2000

(30) Foreign Application Priority Data

Aug. 31, 1999 (JP) ............................................. 11-245816

(51) Int. Cl.$^7$ ........................... G03B 17/24; G03B 17/00
(52) U.S. Cl. .................... 396/315; 396/317; 396/435
(58) Field of Search ............................... 396/310, 311, 396/312, 315, 317, 318, 435

(56) References Cited

U.S. PATENT DOCUMENTS

| | | | | |
|---|---|---|---|---|
| 3,906,552 A | * | 9/1975 | Carroll | 354/105 |
| 5,119,118 A | * | 6/1992 | Harada et al. | 354/106 |
| 5,181,059 A | * | 1/1993 | Mauchan | 354/108 |
| 5,389,989 A | * | 2/1995 | Hawkins et al. | 354/106 |
| 5,436,683 A | * | 7/1995 | Ohshita et al. | 396/310 |
| 5,455,648 A | * | 10/1995 | Kazami | 354/106 |
| 5,493,354 A | * | 2/1996 | Watanabe et al. | 354/106 |
| 5,864,724 A |   | 1/1999 | Ozaki et al. | 396/310 |
| 5,930,538 A |   | 7/1999 | Ozaki et al. | 396/310 |
| 6,044,231 A | * | 3/2000 | Soshi et al. | 396/315 |
| 6,151,452 A | * | 11/2000 | Ping | 396/60 |

FOREIGN PATENT DOCUMENTS

| | | | | |
|---|---|---|---|---|
| EP | 0499742 A1 | * | 8/1992 | G03B/17/24 |
| JP | 56-138731 |   | * 10/1981 | G03B/17/24 |

* cited by examiner

Primary Examiner—Christopher E. Mahoney
(74) Attorney, Agent, or Firm—Greenblum & Bernstein P.L.C.

(57) ABSTRACT

A data imprinting device for a camera is provided with a light shielding system that shields part of light incident on an imaging frame of a film when the frame is exposed to light from an object to form a data imprinting area which is an unexposed area in the imaging frame. The data imprinting device is further provided with a data imprinting system that forms an optical image of data, such as photographing data, on the data imprinting area in a form of an encoded symbol, such as a bar code.

24 Claims, 11 Drawing Sheets

DATA IMPRINTING SYSTEM FOR CAMERA

BACKGROUND OF THE INVENTION

The present invention relates to a camera having a data imprinting function, which is capable of optically recording information related to each frame of image.

Generally, a data imprinting device for a camera is configured such that a small window is formed on a pressure plate of the camera, at a position facing guide rails of a film, and an LED array is provided behind the window. By driving the LED in accordance with data to be imprinted, and converging the light onto the film using an imaging lens, an optical image of the data to be imprinted is formed on the film. The date of photographing, a shutter speed and/or an aperture value are imprinted as the data to be imprinted when a picture is taken or when the film is fed.

There is a system in which data can be magnetically recorded on the film. In such a system, a magnetic recording track is formed on the film along the longitudinal direction thereof (i.e., a film feeding direction), and the data is magnetically recorded using a magnetic head, when the film is fed.

Recently, disposable cameras or throwaway cameras are used. In this type of cameras, on a portion outside an image frame of the film, an image having a predetermined size is formed (i.e., the portion is exposed to light) to indicate whether the frame size is a normal size or a panorama size, which is referred to as print format information in a photo lab. The print format information is read by a printing apparatus when the pictures are printed, and printing is executed in accordance with the print format information.

In order to make the data optically formed on the film recognizable, the data is printed together with the picture on a printing paper. In the system employing the magnetic recording format, the printer is configured to read the magnetically recorded data when the pictures are printed. The data read by the printer is converted into characters, and printed on a front or back side of the printing paper.

The print format information as described above is read by the printer, and printing operation is controlled in accordance with the print format information.

In the above-described cameras, however, information, which is optically or magnetically recorded on the film, is printed on the photographing paper so that users can view the same. In such a system, the information is printed in the form of character strings and/or symbols so that the user can recognize the contents. Since the information (i.e., the characters and/or symbols) are to be printed on the picture, the amount of the information is limited. That is, the printed information may be not more than the date and time of photographing. Due to this limitation, the contents of the data imprinted on the film is also limited to the data and time of photographing.

In a system in which the data is magnetically recorded on a film, the amount of data recordable on the film can be increased. However, even if the amount of the recorded data is increased, it is impossible to print all the recorded data on the picture printed at the photo lab.

In a system employed in the disposable cameras, the recorded information only represents the print format (i.e., normal or panorama), which is used only when the picture is printed, and the user cannot normally recognize the information.

SUMMARY OF THE INVENTION

It is therefore an object of the invention to provide an improved camera capable of recording information on a film as an optical image, the information being printed in the form of machine-readable pattern.

For the object, according to an aspect of the invention, there is provided a data imprinting device for a camera using a photographing film. An image of an object is formed on the photographing film within a frame defined on the photographing film. The data imprinting device is provided with a light shielding system that shields part of light incident on the frame when the frame is exposed to light forming an image of the object on the frame to define a data imprinting area, and a data imprinting system that forms an optical image of data on the data imprinting area in a form of an encoded symbol.

Since the imaging frame is divided into an area in which an object image is formed and another area in which the encoded symbol is formed, various data can be recorded in a visible form. Further, the encoded symbol is not overlaid on the object image.

Optionally, the camera is provided with an aperture member having an aperture defining the frame on the film, light from the object being incident on the film through the aperture, and the light shielding system includes a light shielding plate inserted within the aperture.

With this structure, the data imprinting area can be formed easily. In this case, the light shielding plate is located either one of a retracted position at which the shielding plate does not shield the light passing through the aperture, and a shielding position at which the shielding plate shields the part of the light directed to the film.

Optionally, the light shielding system shields the light directed to at least one side end portion of the frame, the one side end portion extending in a direction along which the film is to be fed. By shielding only one longitudinal side end of the aperture, the data imprinting area is formed. It is obvious to a person skilled in the art that both side ends of the frame could be used for the data imprinting areas. A mechanism to form the two data imprinting areas can be realized using a well-known panorama frame forming mechanism, for example.

Further optionally, the data imprinting system may imprint the data on the data imprinting area when a photographing operation has been finished and the film is being fed.

Still optionally, the camera is provided with an aperture member having an aperture defining the frame on the film, light from the object being incident on the film through the aperture, wherein the camera operates in a first mode in which the data is imprinted on the film, and in a second mode in which the data is not imprinted. In this configuration, a size of the aperture is reduced when the camera operates in the first mode so that the data imprinting area is formed on the film.

In particular case, the encoded symbol includes a bar code. It should be noted that the bar code could be either a one-dimensional or two-dimensional code.

Further, the data imprinting system further imprints a direction indicating code indicating a sense of direction in which the encoded symbol is to be read.

Optionally or alternatively, the encoded symbol represents photographing parameters.

Optionally or alternatively, the encoded symbol represents sound data.

Further optionally, the data imprinting device may include a memory for storing data to be imprinted. The data stored in the memory is imprinted in the form of the encoded symbol.

Optionally, the data imprinting device may include a reference code imprinting system that imprints a reference code representative of a feeding speed of the film when the encoded symbol is being imprinted.

The reference code imprinting system may include a speed detection device that generates a signal corresponding to the feeding speed of the film.

Optionally or alternatively, the data imprinted on the film includes sound data, and the data imprinting device includes a sound data generating system.

In particular, the sound data generating system includes a microphone for picking up sound.

The data imprinting device may include a memory for storing the sound data generated by the sound data generating system, and the sound data stored in the memory is imprinted on the data imprinting area of the film.

Optionally, the data imprinting system may include a sound reproducing system that reproduces sound based on the sound data stored in the memory. Since the sound can be reproduced, the user can confirm the data which will be imprinted on the film.

According to another aspect of the invention, there is provided a camera system, which includes a camera for photographing an object, the camera including a data imprinting that imprints data on a film in a form of an encoded symbol together with an image of an object, and a code reader that reads and decodes the encoded symbol formed on the film.

Optionally, the code reader reads and decodes the encoded symbol formed on a printed picture.

DESCRIPTION OF THE EMBODIMENTS

Hereinafter, embodiments according to the present invention will be described with reference to the accompanying drawings.

Figure 1:
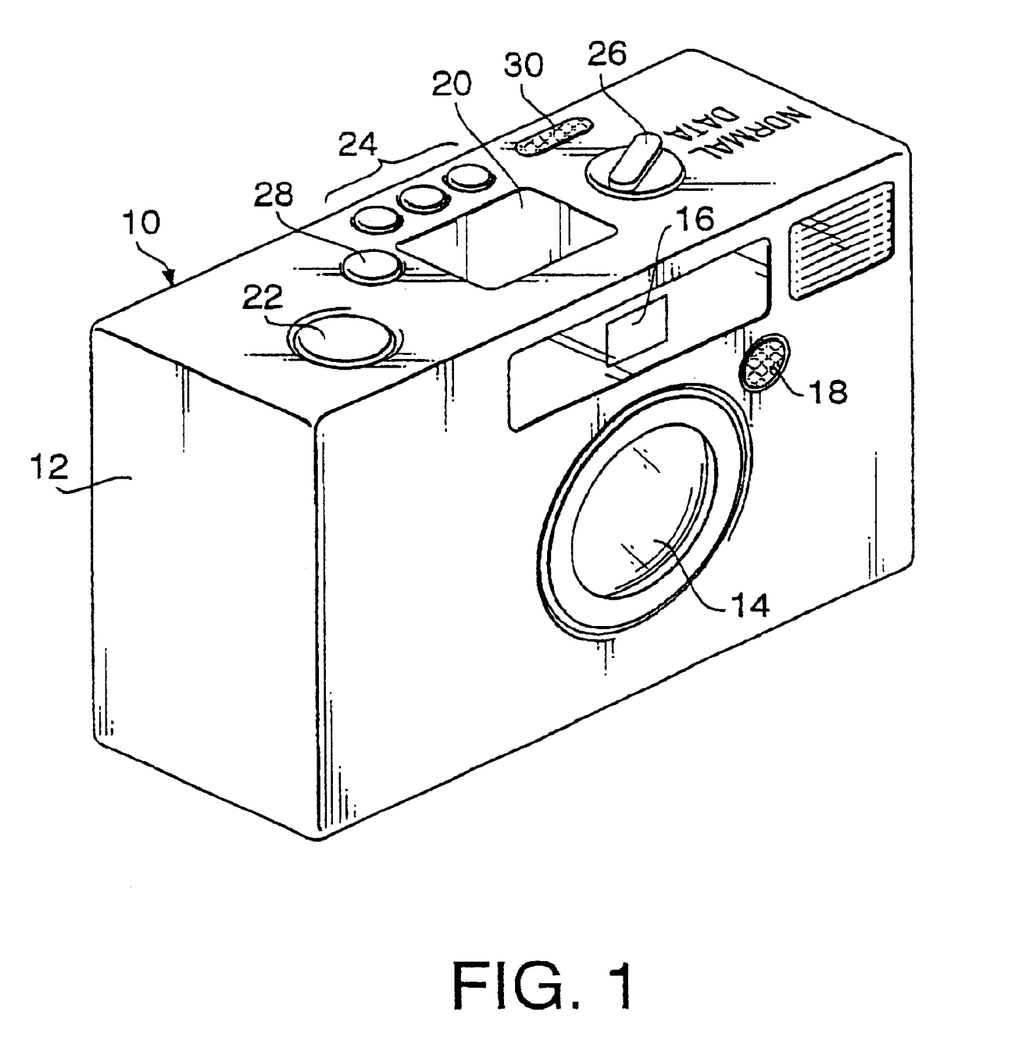
FIG. 1 is a perspective view showing an appearance of a camera according to an embodiment of the invention.

FIG. 1 schematically shows an appearance of a camera 10 according to an embodiment of the invention. The camera 10 is operable in a data imprinting made or a normal photographing mode, i.e., the camera 10 is capable of photographing with/without data imprinted on each photographing frame. The camera 10 has a body 12. On a front surface of the body 12; a photographing lens 14, a finder window 16, a microphone 15 are provided. On the upper surface of the body 12, an LCD (Liquid Crystal Display) panel 20 for displaying various information related to photographing operations, a shutter button 22, a button group 24 including a plurality of buttons for setting exposure modes and data, a mode selection switch 26 for switching a photographing mode between the normal photographing mode and the data imprinting mode, a recording/reproducing button 28 for recording sound information using the microphone 18 and for reproducing recorded sound information, and a speaker 30 for outputting sound wave of the reproduced sound data.

Figure 2A:
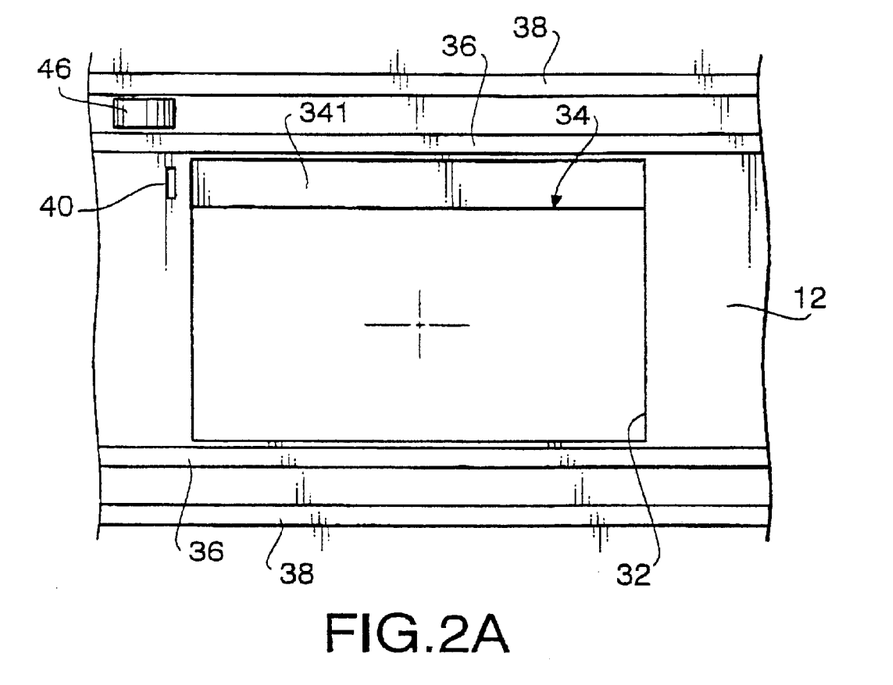
FIG. 2A shows a status of an aperture of the camera according to the invention, when the camera operates in data imprinting mode.
Figure 2B:
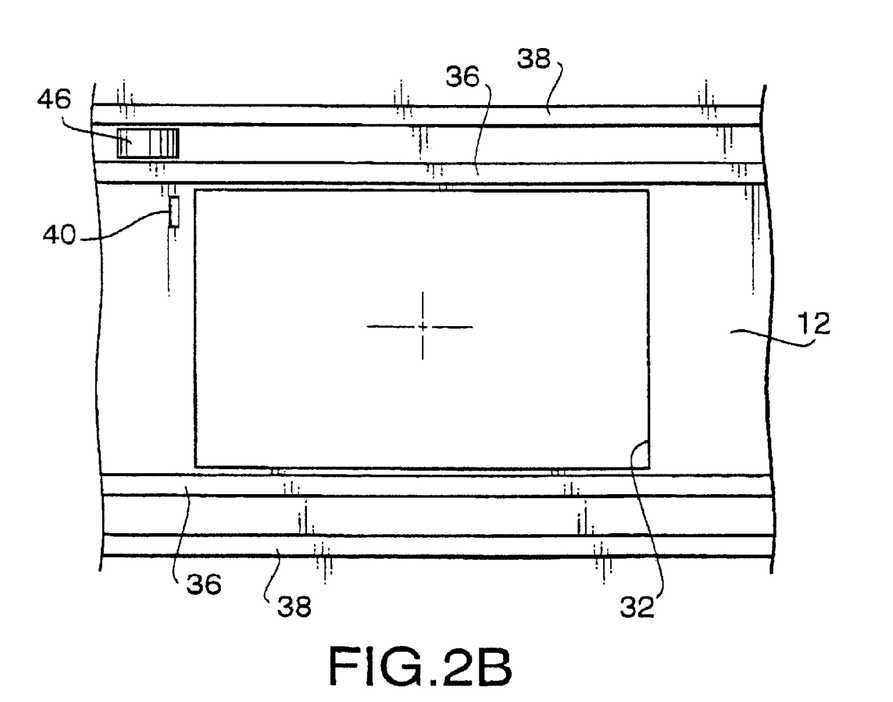
FIG. 2B shows a status when the camera operate in a normal photographing mode in which data will not be imprinted.

FIG. 2A shows a configuration of an aperture 32 when the camera 10 is set to operate in the data imprinting mode. FIG. 2B shows the aperture 32 when the camera 10 is set to operate in the normal photographing mode.

The aperture 32 is formed inside the body 12 of the camera 10, at a portion between the photographing lens 14 and a film (not shown) loaded in the camera 10. Specifically, the aperture 32 is provided within an image circle of the photographing lens 14 on the film to define an area of a photographing frame on the film. Generally, the aperture 32 for a camera using a 35 mm film is 24 mm×36 mm.

The camera 10 is provided with a light shielding mechanism 34 for forming a data imprinting area within a photographing frame on the film. The light shielding mechanism 34 shields a part of the aperture 32, along the longitudinal direction thereof (i.e., the film feeding direction) with a predetermined height using a light shielding plate 341, which can be inserted/retracted with respect to the aperture 32. The area, on the film, corresponding to the shielded portion of the aperture is used for the data imprinting area. In other words, the aperture 32 is reduced to form the data imprinting area.

The light shielding plate 341 is, as shown in FIG. 2A, capable of shielding an upper portion of the aperture 32. It should be noted that the light shielding mechanism 34 may have a structure similar to a well-known panorama frame forming mechanism, which is provided with a pair of light shielding plates for shielding upper and lower areas of the aperture. The light shielding mechanism 34 according to the embodiment uses only one light shielding plate.

The light shielding plate 341 is moved in accordance with the setting of the mode selection switch 26. When the mode selection switch 26 is located to select the data imprinting mode as shown in FIG. 1, the light shielding plate 341 is inserted within the aperture 32, as shown in FIG. 2A, to shield the upper area of the aperture so as to form an unexposed area 48A (see FIG. 3) within the photographing frame. As will be described, the unexposed area (i.e., the data imprinting area) of the film will be exposed to light in accordance with data to be imprinted.

When the mode selection switch 26 is set to select the normal photographing mode, the light shielding plate 341 is retracted from the aperture 32 as shown in FIG. 2B.

The height of the area of the aperture 32 shielded by the light shielding plate 341 is approximately 4 mm, and therefore a photographing area 48B (see FIG. 3) on a film 48 when the aperture 32 is partially shielded by the light shielding plate 341 is approximately 20 mm×36 mm. The aspect ratio of this area 48B is 9:16, which is the ratio of a well-known hi-vision format.

As shown in FIGS. 2A and 2B, on the upper side of the aperture 32, a pair of guide rails (inner and outer guide rails) 36 and 38 are provided. On the lower side of the aperture 32, the similar pair of guide rails 36 and 38 are provided. The rails 36, 36, 38 and 38 are parallel to each other, and are secured on the camera body 12 to extend in the longitudinal direction of the aperture 32. In each pair, the outer guide rail 38 is spaced from the inner guide rail 36 by a predetermined amount. On a left-hand side of the aperture 32 in the drawings, adjacent to the upper inner rail 36, a data imprinting slit 40 is formed, through which light is emitted to the data imprinted area 48A to form the data to be imprinted. Behind the data imprinting slit 40, a data imprinting device 42 and a film feeding speed imprinting device 44 are provided (described later).

Adjacent to the data imprinting slit 40, between the upper inner rail 36 and the upper outer rail 38, a roller 46, which rotates in association with feeding of the film 48, is rotatably supported.

Figure 3:
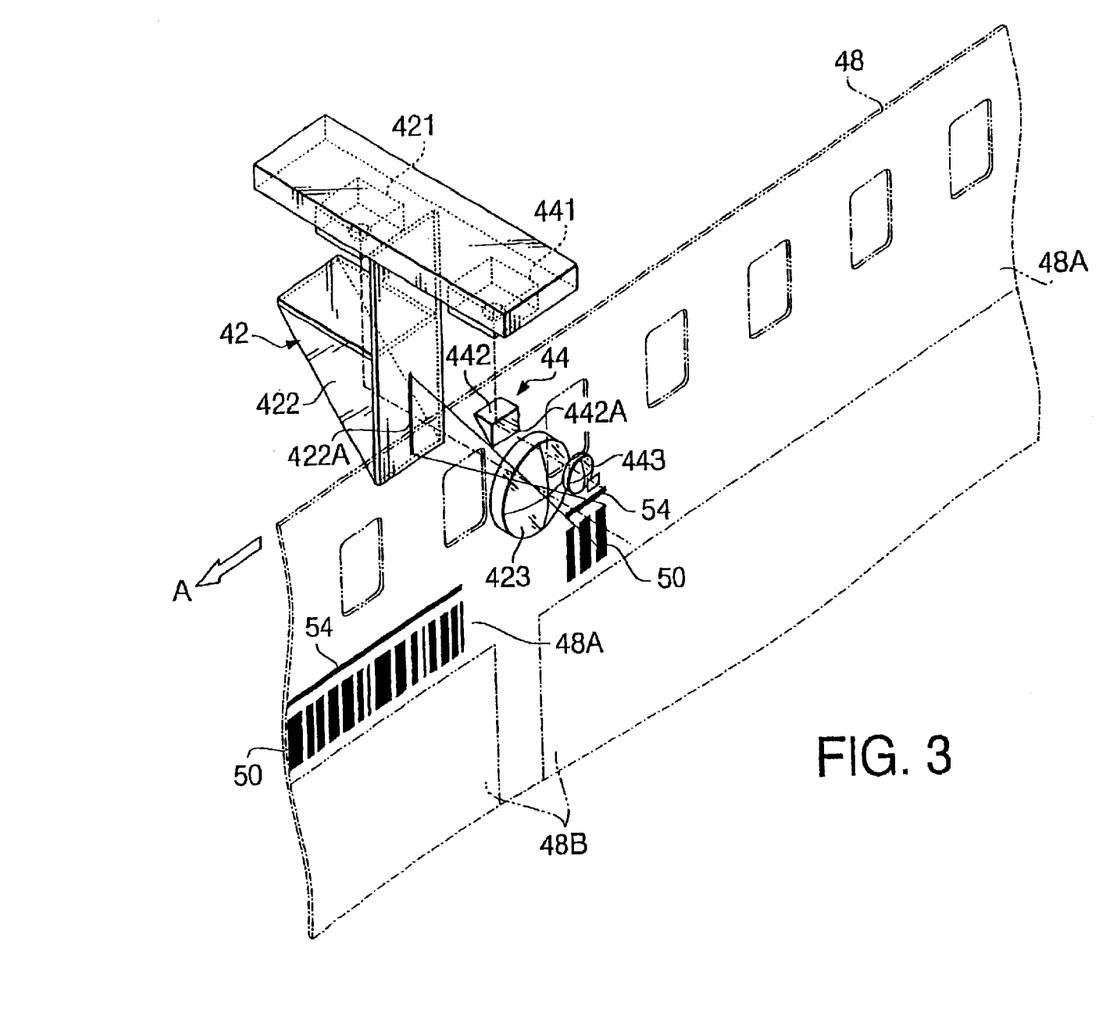
FIG. 3 is a perspective view of a data imprinting device employed in the camera shown in FIG. 1.

The data imprinting device 42 is used for imprinting data to be imprinted on the data imprinting area 48A of the film 48 in a form of a bar code 50. The data to be imprinted includes:

a date and/or time of photographing;

a shutter speed and/or an aperture value;

photographing data which does not require an intentional operation of a user, such as a focal length of the photographing lens 14; and photographing data which requires an intentional operation of a user, such as format and/or compensation data for printing, a message relating to each frame.

As shown in FIG. 3, the data imprinting device 42 includes:

a light source 421 such as an LED (Light Emitting Diode) for emitting light modulated in accordance with the data to be imprinted;

a reflecting member 422 having a reflecting surface for reflecting the light emitted by the light source 421 toward the data imprinting slit 40, and a slit aperture 422A for defining a cross-sectional area of the light directed toward the data imprinting slit 40, the slit aperture 422A having a rectangular aperture corresponding to each bar of the bar code; and an imaging lens 423 provided between the slit aperture 422A and the data imprinting slit 40, the imaging lens 423 converging the light passed through the slit aperture 422A on the data imprinting area 48A of the film 48, through the data imprinting slit 40.

The film feeding speed imprinting device 44 is used for imprinting a reference code 54 related to a film moving speed on the data imprinting area 48A together with the bar code 50, based on a signal output by an encoder 52 (see FIG. 4) for detecting a film feeding speed. The film feeding speed imprinting device 44 includes, as shown in FIG. 3;

a light source 441 such as an LED (Light Emitting Diode) for emitting light modulated in accordance with a signal output by the encoder 52;

a reflecting member 442 having a reflecting surface for reflecting the light emitted by the light source 441 toward the data imprinting slit 40, and a slit aperture 442A for defining a cross-sectional area of the light directed toward the data imprinting slit 40, the slit aperture 442A having a rectangular aperture corresponding to the bar code; and an imaging lens 443 provided between the slit aperture 442A and the data imprinting slit 40, the imaging lens 443 converging the light passed through the slit aperture 442A on the data imprinting area 48A of the film 48, through the data imprinting slit 40.

Figure 4:
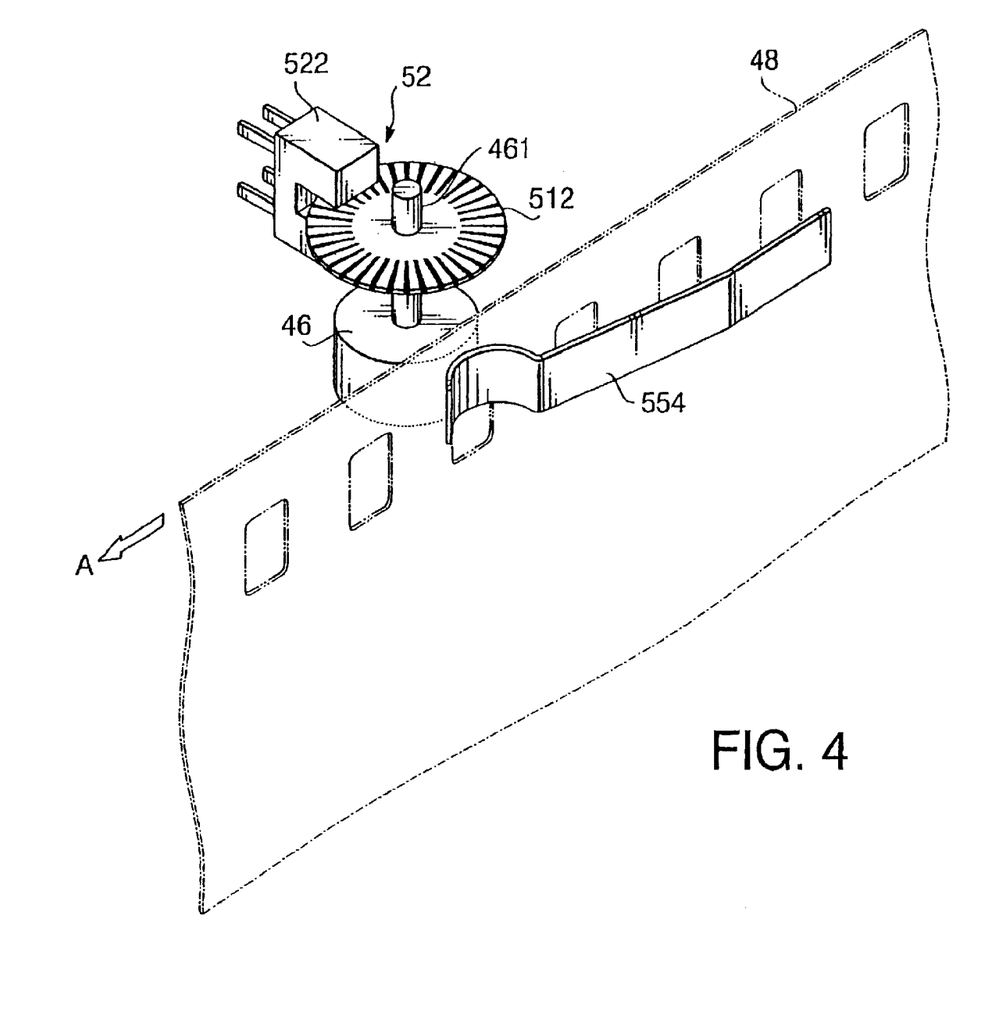
FIG. 4 is a perspective view of an encoder for detecting the film feeding speed.

The encoder 52 includes, as shown in FIG. 4, an encoding disk 521 secured onto a shaft 461 of the roller 46, which rotates in association with movement of the film 48 in the feeding direction, the encoding disk 521 being formed with a plurality of altering transparent and opaque portions which extend in a radial direction and are evenly distributed along the circular direction; and a photo interrupter 522 for detecting the alteration of the transparent and opaque portions on the encoding disk 521 to output a pulse signal corresponding to the feeding speed of the film 48. In FIG. 4, 554 denotes a spring member for urging the film 48 onto the outer surface of the roller 46.

Figure 5A:
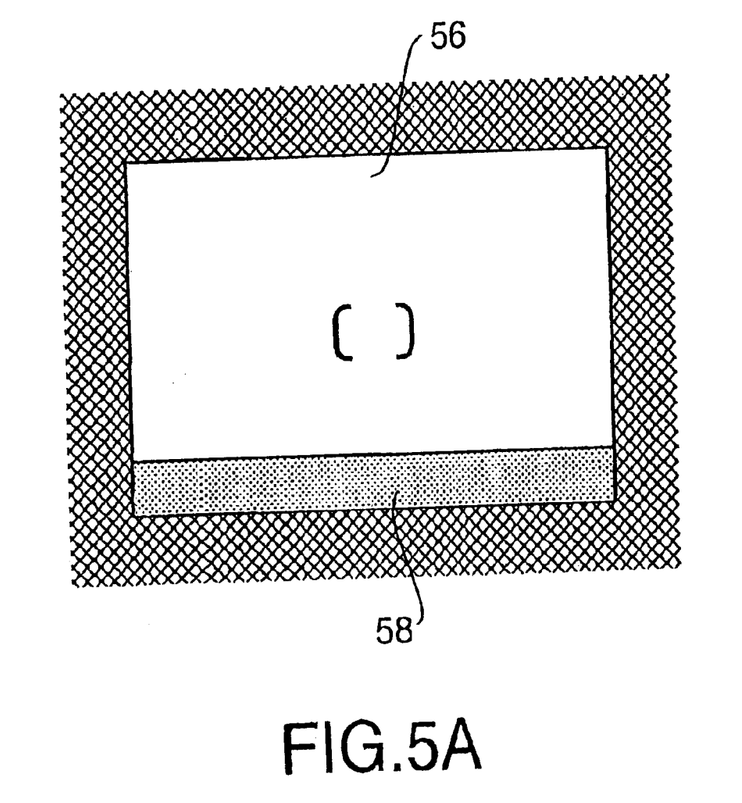
FIG. 5A shows a field of view of a finder when the camera operates in the data imprinting mode.
Figure 5B:
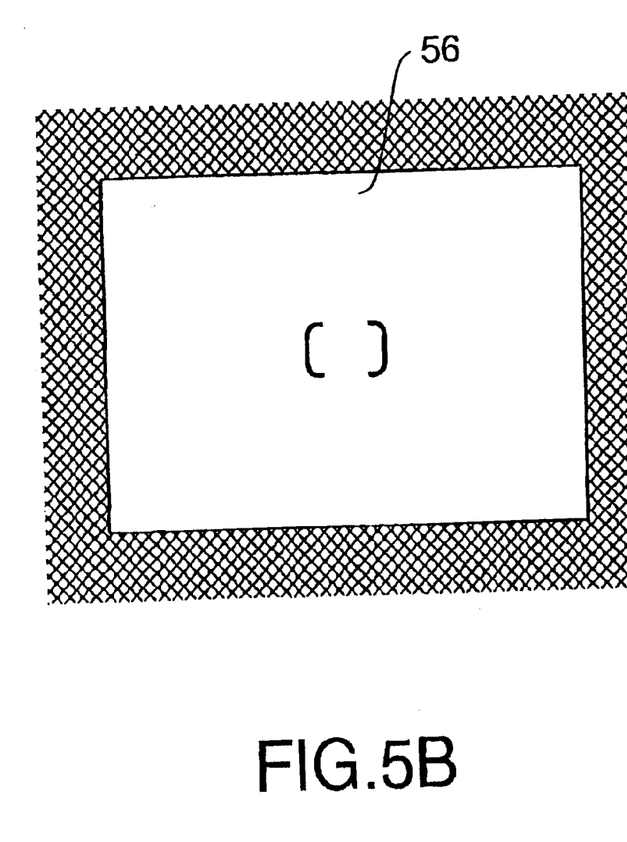
FIG. 5B shows a field of view of the finder when the camera operates in the normal photographing mode.

FIG. 5A shows a finder field when the camera 10 operates in the data imprinting mode. FIG. 5B shows the finder field when the camera 10 operates in the normal photographing mode.

When the camera 10 operates in the data imprinting mode, a part of the aperture 32 is shielded as described above. Corresponding to the partial shielding of the aperture 32, the finder field 56 is masked with a finder shielding plate 58 at the portion corresponding to the shielded portion of the aperture 32.

The finder shielding plate 58 is moved in association with the mode selection switch 26. That is, when the mode selection switch 26 is located to select the data imprinting mode, the finder shielding plate 58 is inserted within the finder field 56 to shield the lower part of the finder field 56, while when the mode selection switch 26 is located to select the normal photographing mode, the finder shielding plate 58 is retracted from the finder field 56 as shown in FIG. 5B.

A data imprinting system according to the embodiment of the invention will be described in detail hereinafter with reference to FIG. 6.

Figure 6:
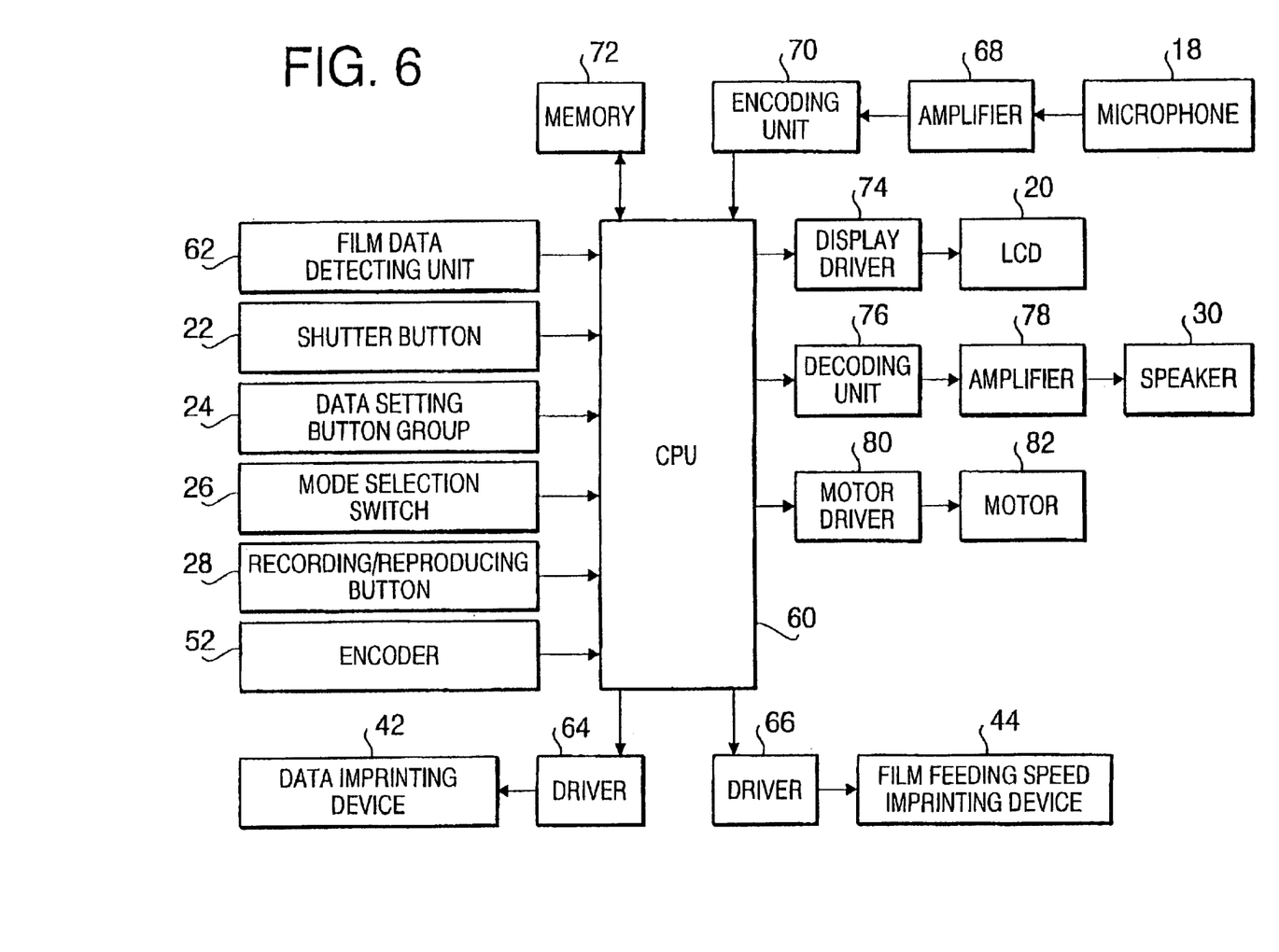
FIG. 6 is a block diagram illustrating a control system of the camera.

FIG. 6 is a block diagram of the camera 10 illustrating an electronic structure thereof.

The camera 10 has a CPU 60 which controls the entire system of the camera 10. The CPU 10 is electrically connected with a film information detection unit 62 for detecting photographing data, which includes:

a film sensitivity, the number of remaining or used frames of the film 48; and the operational states of the shutter button 22, the data setting button group 24, the mode selection switch 26, the recording/reproducing button 28, and the encoder 52.

Further, the data imprinting device 42 and the film feeding speed imprinting device 44 are connected to the CPU 60 via drive circuits 64 and 66, respectively.

To the CPU 60, the microphone 18 is connected through an amplifier 68 and an encoding unit 70. The amplifier 68 amplifies the sound signal picked up by the microphone 18, and the encoding unit 70 samples the sound signal output by the amplifier 68 at a predetermined sampling rate, quantizes and encodes the sampled signal to output a digital sound signal. The CPU 60 is also connected with a memory 72 for temporarily storing sound data output by the encoding unit 70 and photographing data detected by the film information detecting unit 62.

Via an LCD drive circuit 74, the CPU 60 is connected with the LCD 20. Via a decoding unit 76 and an amplifier 78, the CPU 60 is connected with a monitoring speaker 30. The decoding unit 76 retrieves the sound data, via the CPU 60, from the memory 72, converts the digital data into an analog sound signal, and transmits the same to the amplifier 78.

The CPU 60 is connected with a motor 82 via a motor driving circuit 80. The motor 82 is used for winding/rewinding the film 48.

Next, an operation of the camera 10 constructed as above will be described.

Firstly, an operation when the data imprinting mode is selected will be described. When the film 48 is loaded in the camera body 12, and the mode selection switch 26 is located to select the data imprinting mode, the camera 10 operates in the data imprinting mode.

When the camera 10 operates in the data imprinting mode, the light shielding mechanism 34 inserts the light shielding plate 341 within the aperture 32 as shown in FIG. 2A. Thus, the data imprinting area 48A will be formed when a photographing operation is performed to expose the film to light from an object.

As aforementioned, when the camera 10 operates in the data imprinting mode, the finder shielding plate 58 is inserted within the finder field 56 so that the image viewed within the finder field is identical to the image to be formed on the film 48. Thus, it is ensured that what is viewed through the finder is photographed.

When the camera 10 is set to operate in the data imprinting mode, and the shutter button 22 is depressed halfway, a focusing lens of the photographing lens 14 is driven to focus on an object in accordance with distance information obtained by a not-shown distance measuring device. At the same time, a photometry operation is performed to determine exposure parameters, i.e., a shutter speed and an aperture value. When the shutter button 22 is fully depressed, aperture and shutter mechanisms are driven, and the film 48 is exposed to light through the aperture 32. As aforementioned, since the upper portion of the aperture 32 is shielded by the light shielding plate 341, the area 48B indicated by a one dotted line is used as the photographing area, and the remaining area 48A is not exposed to the light, which is used as the data imprinting area.

When the film 48 has been exposed to light as the shutter operates, i.e., the photographing has been finished, the motor 82 is driven and the film 48 is fed by one frame. When the film 48 is wound, as shown in FIG. 3, the un-exposed data imprinting area 48A of the frame is exposed to the light emitted by the data imprinting device 42 such that the data to be imprinted is imprinted in the form of the bar code 50. At the same time, the reference code 54 is also imprinted by the film feeding speed imprinting device 44.

As described above, the reference code 54 in related to a film moving speed when the bar code 50 is imprinted. The reference code 54 is formed, for example, by driving the film feeding speed imprinting device 44 at a predetermined period. With this control, for example, a dot or a bar is imprinted on the film 48 at every predetermined period. When the feeding speed varies when the reference code 54 is being imprinted, intervals between imprinted dots varies. When a printed bar code is read, by referring to the reference code as printed, the bar code can be read correctly regardless of change of feeding speed during the imprinting process as well as change of reading speed of the bar code.

When the bar code representing the data is imprinted on the film 48 by the data imprinting device 42, firstly, the data to be imprinted such as the photographing data including the shutter speed and the aperture value of the frame, and a message related to the frame are converted into digital data by the encoding unit 70, and the photographing data is stored in the memory 72 shown in FIG. 6.

When the shutter button 22 is fully depressed and a photographing operation has been finished, and then the motor 82 is driven to start feeding the film 48, the data stored in the memory 72 is retrieved by the CPU 60 sequentially. The retrieved data is converted into a bar code data by a bar code converting unit included in the CPU 60, converted into an analog signal by a D/A conversion unit included in the CPU 60, and then transmitted to the drive circuit 64.

The drive circuit 64, in accordance with the signal transmitted from the CPU 60, drives the light source 421 to turn ON and OFF. Thus, the data to be imprinted is converted into an optical signal. The light emitted by the light source 421 is directed to the data imprinting slit 40 as reflected by the reflecting member 422. The light further passes through the slit aperture 422A, passes through the imprinting slit 40, and is converged on the data imprinting area 48A by the imaging lens 423.

By driving the light source 421 in accordance with the data to be imprinted when the film 48 is being fed, the photographing data is imprinted in the data imprinting area in the form of the bar code 50.

The quantity of data imprinted in the form of the bar code 50 in the data imprinting area 48A of one frame is relatively small. However, it is sufficient for imprinting the photographing data such as the shutter speed, the aperture value, and the focal length.

When the film 48 is fed in direction A in FIG. 4, the pulse signal corresponding to the moving speed of the film 48 is output by the encoder 52. The pulse signal is transmitted to the drive circuit 66 via the CPU 60.

The drive circuit 66 drives the light source 441 of the film feeding speed imprinting device 44, in accordance with the pulse signal, to turn ON and OFF. This light signal is reflected by the reflecting member 442 toward the data imprinting slit 40 through the slit aperture 442A. The light passed through the slit aperture 442A is converged by the imaging lens 443 on the data imprinting area 48A via the data imprinting slit 40.

Thus, as shown in FIG. 3, as the film 48 is fed in direction A, the reference code 54 is imprinted in the data imprinting area 48A together with the bar code 50.

The reason why the reference code 54 is imprinted on the film 48 is as follows. The bar code 50 is a one-dimensional bar code consisting of a plurality of bars extending in the width direction of the film 48 and arranged along the feeding direction of the film 48. In this bar code 50, the width of each bar and the width of the space should be detected accurately to decode correctly. If the film feeding speed varies when the bar code 50 is being read, the bar code 50 may not be correctly decoded. Therefore, by imprinting the reference code 54 together with the bar code 50 in the data imprinting area 48A, as shown in FIG. 3, the variation of the feeding speed is compensated and reading errors of the bar code 50 can be avoided.

When the mode selection switch 26 is located at the position indicating the normal photographing position, the camera 10 operates in the normal photographing mode, in which data imprinting is not performed.

Thus, in the normal photographing mode, the light shielding plate 341 is retracted from the aperture 32. Thus, the aperture 32 is fully opened as shown in FIG. 2B. In other words, the photographing area is substantially the same as the area of the aperture 32.

Further, when the normal photographing mode is selected, the finder shielding plate 58 is retracted from the finder field 56, as shown in FIG. 5B. Of course, in the normal photographing mode, the data imprinting device 42 and the film feed speed imprinting device 44 are kept inoperative.

Figure 7:
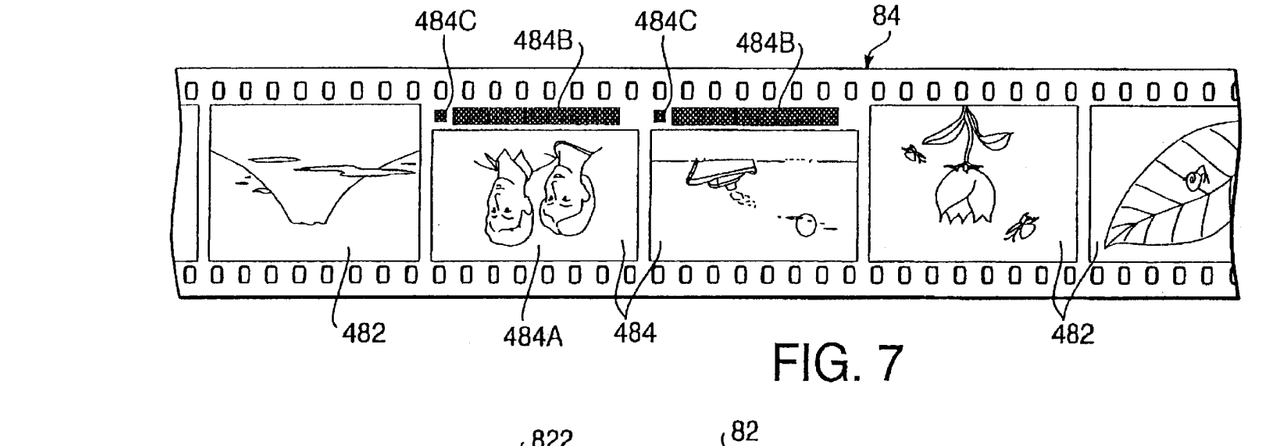
FIG. 7 shows an example of a developed film used in the camera shown in FIG. 1.

FIG. 7 shows an example of a developed negative film 48 which was exposed using the camera 10. In FIG. 7, a frame 482 represents a frame of an image taken in the normal photographing operation. The image is formed over the entire area of the frame which is defined by the aperture 32.

The frame 484 represents an example of a frame of an image when the camera operates in the data imprinting mode. In this frame 484, the image of the object 484A and the image of the imprinted data 484B are formed.

At the beginning of the image of the imprinted data, an indicator 484C for indicating a direction of scanning when the imprinted data is read is formed. The indicator 484C is A generated by the data imprinting device 42 and imprinted when the data to be imprinted is formed. It should be noted that when the bar code is read, scanning should be started from the indicator 484C and then along the bar code.

Next, an operation of the camera 10 when a sound message is recorded and imprinted will be described.

Firstly, the recording/reproducing button 28 is depressed to set the recording/reproducing mode, i.e., the microphone 18 is made operable. Then, the user talks a message, e. g., a message indicating a place related to the photographed frame to the microphone 18.

The microphone 18 converts the user's voice message into electrical sound signal, which is amplified by the amplifier 68 and input to the encoding unit 70. The encoding unit 70 sequentially samples the transmitted sound signal at a predetermined frequency, and converts the sampled signal into a digital signal. The converted digital sound signal is sequentially stored in the memory 72 as sound data by the CPU 60.

After the message (sound data) is stored in the memory 72, if the recording/reproducing button 28 to set the CPU 60 to operate in a reproducing mode, the monitor speaker 30 becomes operable. Then, the sound data stored in the memory 72 is sequentially retrieved by the CPU 60, converted into an analog sound signal by the decoding unit 76, and transmitted into the amplifier 78. The amplified sound signal is transmitted to the speaker 30, which outputs the sound message.

Thus, the user is capable of confirming the message stored in the memory 72. If the message is not what the user intended, or recording error has occurred, the above procedure is to be repeated to record the sound message.

The message is to be recorded before the frame related to the message is photographed. The sound data stored in the memory 72 is retrieved by the CPU 60 when the film 48 is fed, converted into bar code data, based on which the drive circuit 64 drives the data imprinting device 42. Thus, as shown in FIG. 3, the sound data is imprinted on the film 48 in the form of the bar code 50.

Figure 8:
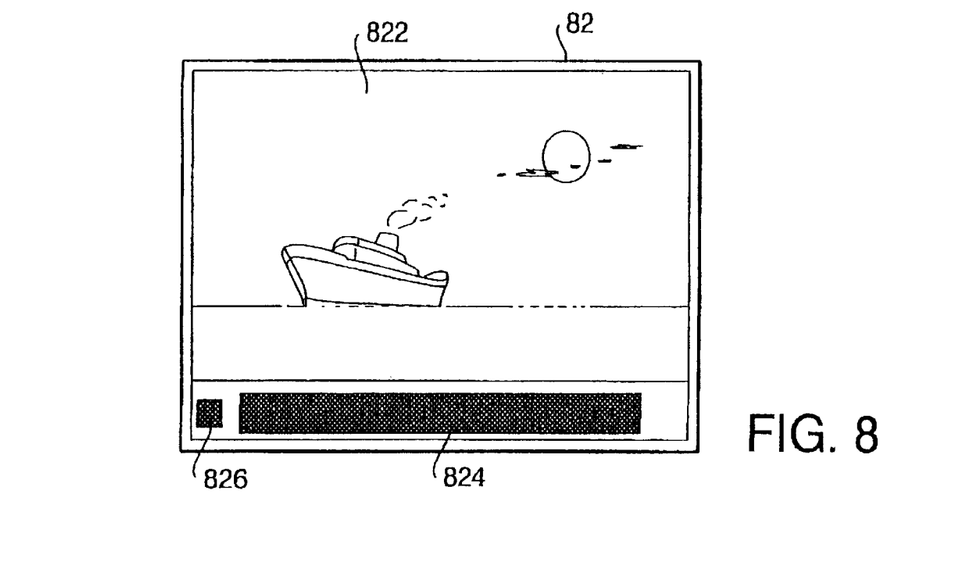
FIG. 8 is an example of a printed picture, on which a bar code representing the data is printed.

FIG. 8 shows a printed picture 82 of one of the frames photographed by the camera 10.

The picture 82 contains an object image 822, an imprinted data image 824, and the scanning direction indicator 826. By scanning the imprinted data image 824 with a code reading device along the indicated direction, the imprinted data can be reproduced.

Next, a code reading device 200 for reading the imprinted data will be described with reference to FIGS. 9 and 10.

Figure 9:
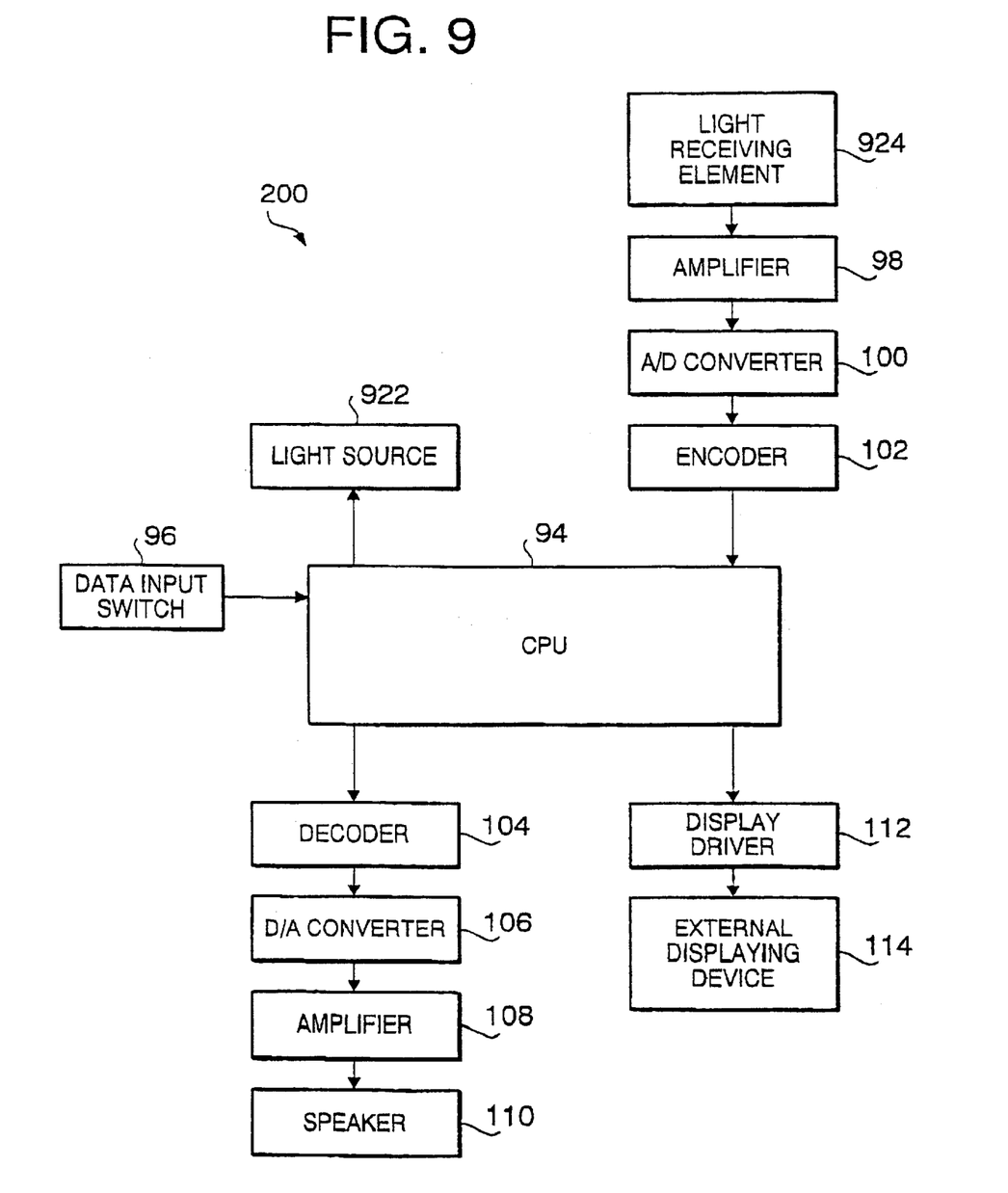
FIG. 9 is a block diagram of a code reading device used for reading the bar code formed in the picture.
Figure 10:
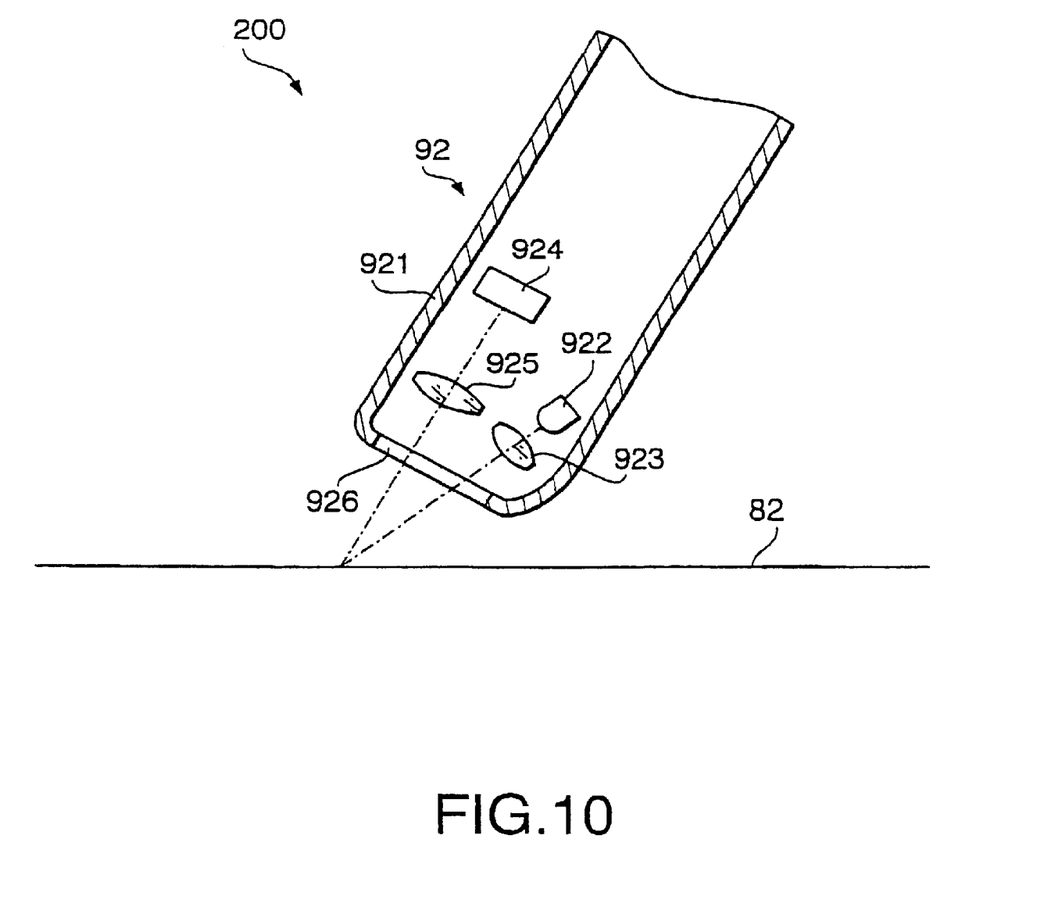
FIG. 10 schematically shows a structure of a reading head of the code reading device.

FIG. 9 is a block diagram of a code reading device 200 according to the embodiment of the invention. FIG. 10 schematically shows a structure of a reading head 92 of the code reading device 200.

The reading head 92 includes a head body 921, a light source 922 accommodated in the body 921, a lens 923 accommodated in the body 921 to collect the light emitted by the light source 922 to illuminate an object (i.e., the imprinted data image), a light receiving element 924 such as a CCD (Charge Coupled Device) 924, and an imaging lens 925 which receives the light reflected by the object (i.e., the imprinted data image) and converges the reflected light on the light receiving surface of the light receiving element 924 to form an image of the object (i.e., the imprinted data image).

Next, a configuration of the code reading device 200 will be described with reference to FIG. 9. The code reading device 200 includes a CPU 94. The CPU 94 is connected with a data input switch 96 for inputting data required for reading bar codes. The CPU 94 is further connected with a light source 922 of the reading head 92, and a light receiving element 924 of the reading head 92 through an amplifier 98, an A/D converter 100 and an encoder 102.

Further, the CPU 94 is connected with a monitor speaker 110 through a decoder 104, a D/A converter 106 and an amplifier 108. An external displaying device 114 is connected to the CPU 94 through a display driver 112.

An operation of the code reading device configured as above will be described.

The reading head 92 is made operable when the data input switch 96 is operated and the CPU 94 is set to the reading operation mode. In this state, a reading opening 926 (see FIG. 10) of the reading head 92 is oriented to face the scanning direction indicator 826 on the data imprinting area on the picture 82 shown in FIG. 8. Scanning is performed by moving the imprinted data image 824 in the direction indicated by the scanning direction indicator 826.

As the scanning is initiated, the light emitted by the illuminating light source 922 is directed to the bar code (i.e. the imprinted data image) via the lens 923. The reflected light is converged by a lens 925 on the light receiving element 924. The light receiving element 924 converts the received image of the bar code into an electrical signal corresponding to the image. The signal is transmitted to the amplifier 98, which amplifies the signal, and is converted into a digital signal by the A/D converter 100. The digital signal carries data indicative of widths of the bars and spaces constituting the bar code.

The encoder 102 converts the digital data form of the bar code into ASCII codes, which are transmitted to the CPU 94 and temporarily stored in the memory built in the CPU 94.

The data stored in the memory built in the CPU 94 is is sequentially retrieved and converted into analog quantities by the D/A converter built in the CPU 94, which are output to the display driver 112. The display driver 112 controls the external display device 114 in accordance with the analog signals, thereby the data represented by the bar code 50 is displayed with characters and symbols. If the imprinted data represents the sound signal, the data retrieved from the built-in memory is decoded by the decoder 104, and the decoded sound data is converted into an analog sound signal using the D/A converter 106. The analog sound signal is amplified by the amplifier 108 and transmitted to the speaker 110. In this case, various messages such as the date and time of the picture, the place where the picture was taken are notified by sound.

According to the camera configured as above, the data imprinting area is formed by shielding a part of the aperture, and information related to the frame is optically imprinted in the data imprinting area of the film in the form of the bar code. Thus, the bar code representing the imprinted data is formed on the printed picture together with the object image. Various data such as photographing parameters, date/time, messages related to the photographing frame can be formed on the printed picture in the form of an encoded symbol, i.e., the bar code. In the conventional cameras, such information was not printed since the amount of information is too large to print on the picture since all the data was represented by characters and symbols on the picture. However, according to the present invention, such data can be printed together with the object image. The information can be reproduced as an image displayed on the display unit of the code reader and/or as sound output from the speaker of the code reader. With this measure, the user can recognize the information easily.

Further, since the encoded symbol (e.g., the bar code) formed on the picture can be read by a code reader and the messages and/or sound can be reproduced, without changing a conventional photo lab system, values are added to photographs.

If a printer at the photo lab is provided with a code reader capable of reading the imprinted data formed on the film, the imprinted data can be used as magnetic data of the APS films and as data for setting printing condition of the picture and/or data overlaid on the picture.

Furthermore, since the data related to a frame of an image is imprinted within a data imprinting area defined within the frame, even if each frame is cut out and mounted on a slide mount, the imprinted data can be read and the original message/information can be reproduced.

Figure 11A:
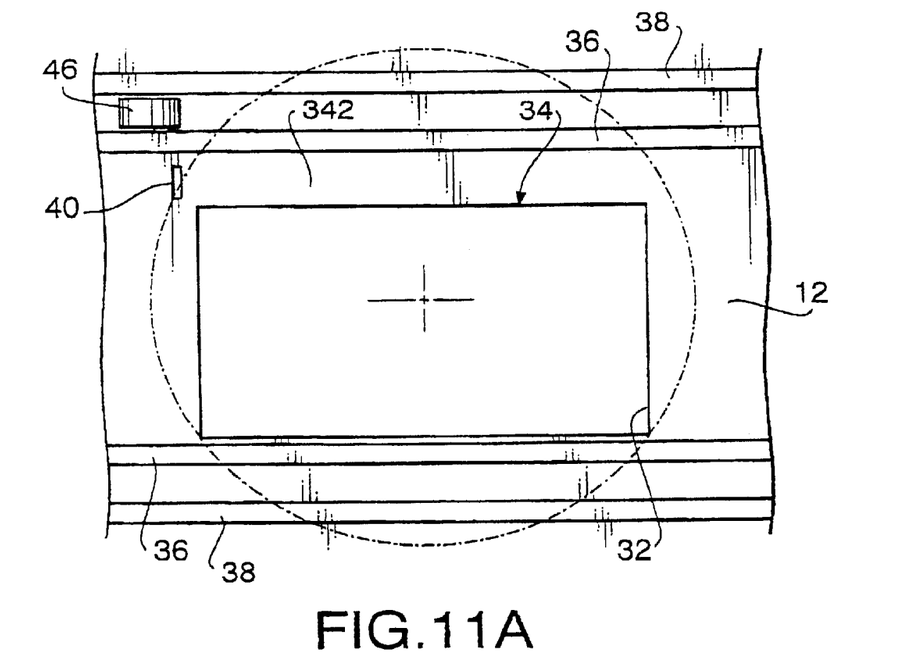
FIGS. 11A and 11B illustrate an aperture which defines the data imprinting area.
Figure 11B:
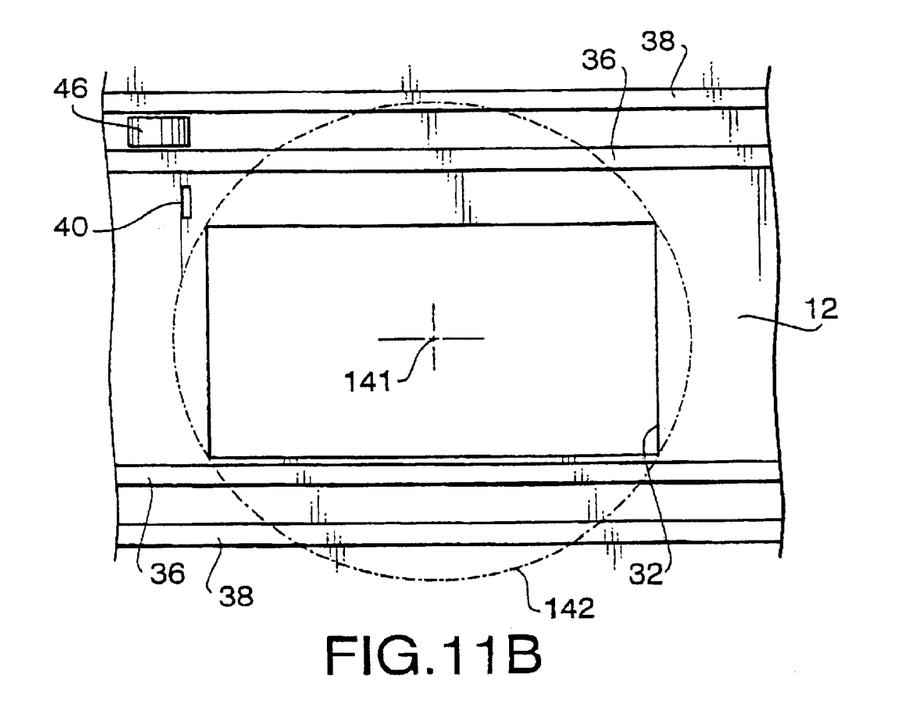

In the above embodiment, only one of the upper end portion and lower end portion is shielded from light by inserting the light shielding plate 341 within the aperture 32 to form the data imprinting area. The invention is not limited to this configuration. For example, as shown in FIG. 11A, the light shielding mechanism 34 may be constructed to have the reduced size of the aperture 32 by an amount corresponding to the data imprinting area 342. In this case, every frame is formed with the data imprinting area. In such a camera, it is preferable that the optical axis 141 of the photographing lens is aligned to coincide with the central axis of the aperture 32 as shown in FIG. 11B. It should be noted that, in FIGS. 11A and 11B, the same reference numerals are assigned to the members identical to those shown in FIG. 2.

According to this structure, an image circle of the photographing lens can be reduced, and therefore, the photographing lens and mechanisms related to the lens can be downsized.

Next, a data imprinting device according to a second embodiment of the invention will be described with reference to FIG. 12.

Figure 12:
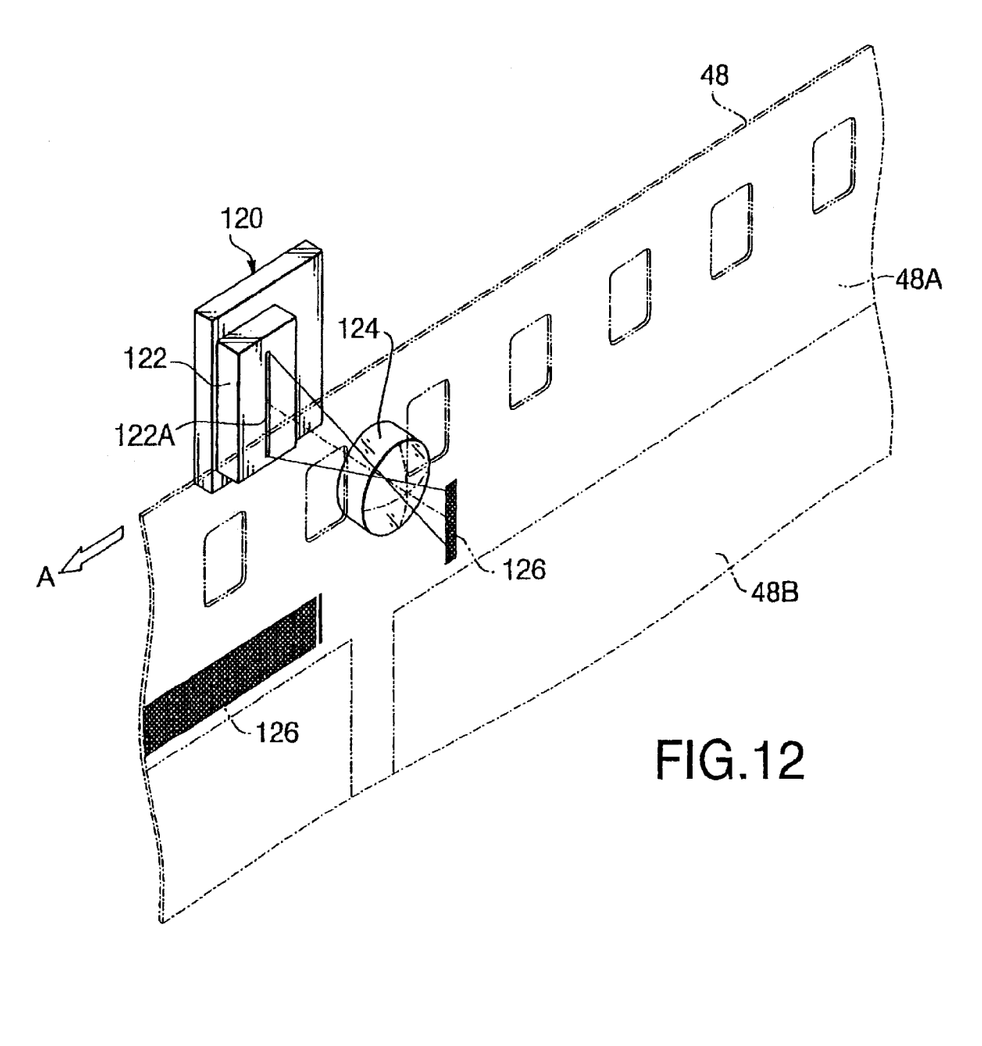
FIG. 12 is a perspective view of the data imprinting device according to a second embodiment of the invention.

In FIG. 12, the data imprinting device 120 is for imprinting data in the form of an encoded symbol such as a two-dimensional bar code, a two-dimensional codes or the like in the data imprinting area 48A of the film 48. The data imprinting device 120 is provided with an LED array 122 having a plurality of LED's 122A aligned in a line, and an imaging optical system 124 which converges the light emitted by the LED array 122 in the data imprinting area 48A of the film 48 through the data imprinting slit 40 (see FIG. 2).

In FIG. 12, the area 48B indicated by a single dotted line is an area on which the object image is formed. The length of the LED array 122 is determined to be shorter than the width of the data imprinting area 48A.

In order to imprint data in the data imprinting area 48A using the data imprinting device 120, when the film 48 is fed in the direction A, each LED 122A is driven by the CPU of the data imprinting device 120 in accordance with the data to be imprinted so that the plurality of LED's are turned ON/OFF, respectively. The linear pattern determined by the ON/OFF status of the LED's 122A of the LED array 122 is converged on the data imprinting area 48A by the imaging optical system 124, and the image is imprinted. By converging the image pattern defined by the ON/OFF status of the LED's on the film 48 with the film 48 being moved in the direction A, a two-dimensional encoded symbol 126 as shown in FIG. 12 is imprinted in the data imprinting area 48A.

When the data is imprinted in the form of the two-dimensional pattern, the capacity of data can be increased. Therefore, a large amount of data related to the frame can be recorded.

In the embodiments above, imprinting of the data is made from either a photographic emulsion side of the film 48 or the opposite side (i.e., a base side).

In the embodiments, data imprinting operation is executed on frame basis. The invention is not limited to this configuration, and, for example, data for all the frames are stored in a memory, and data for all the frames can be imprinted when the film is rewound.

The film is not limited to the 35 mm film. The present invention is applicable to any type of film having an area on which an optical image is formed.

It is preferable that the intensity and/or period of light emission of the light source are adjusted acceding to the ISO sensitivity of the film so as to prevent over- or under-exposure conditions.

Generally, the area of a frame printed as a picture at a photo lab is smaller than the entire area of the frame on the film. Accordingly, it is preferable that the position at which the data is imprinted is determined so that the imprinted data appears on the printed picture.

As an alternative for imprinting the two-dimensional symbol, an LCD and a back light therefor can be used as an image source, which image is converged on the film.

As described above, according to the embodiments of the invention, data related to a frame is imprinted within a frame area of the film in the form of an encoded optical symbol. With this configuration, since the encoded symbol is formed on the printed picture or the slide-mounted film, the original data can easily be reproduced using a code reader.

The present invention relates to subject matter contained in Japanese Patent Application No. HEI 11-245816, filed on Aug. 31, 1999, which is expressly incorporated herein by reference in its entirety.

What is claimed is:

1. A data imprinting device for a camera using a photographing film, an image of an object being formed on a photographing frame defined on the photographing film, said device comprising:

a light shielding system that shields part of said photographing frame and prevents said part of said photographing frame from being exposed to light forming an image of the object on the photographing frame, said light shielding system defining a data imprinting area in said part; and a data imprinting system that forms an optical image of encoded data on said data imprinting area in a form of an encoded symbol, when the light shielding system forms the data imprinting area, said encoded data readable by an encoded data reader.

2. The data imprinting device according to claim 1, wherein the camera is provided with an aperture member having an aperture defining the frame on the film, light from the object being incident on the film through said aperture, and wherein said light shielding system includes a light shielding plate inserted within said aperture.

3. The data imprinting device according to claim 2, wherein said light shielding plate is located either one of a retracted position at which said shielding plate does not shield the light passing through the aperture, and a shielding position at which said shielding plate shields the part of the light directed to the film.

4. The data imprinting device according to claim 1, wherein said light shielding system shields the light directed to one side end portion of said frame, said one side end portion extending in a direction along which said film is to be fed.

5. The data imprinting device according to claim 1, wherein said data imprinting system imprints the data on said data imprinting area when a photographing operation has been finished and said film is being fed.

6. The data imprinting device according to claim 1, wherein the camera is provided with an aperture member having an aperture defining the frame on the film, light from the object being incident on the film through said aperture, wherein said camera operates in a first mode in which the data is imprinted on the film, and in a second mode in which the data is not imprinted, a size of the aperture being reduced when the camera operates in the first mode so that said data imprinting area is formed on the film.

7. The data imprinting device according to claim 1, wherein said encoded symbol comprises a bar code.

8. The data imprinting device according to claim 7, wherein said data imprinting system further imprints a direction indicating code distinct from said encoded symbol, said direction indicating code indicates a sense of direction of the encoded symbol.

9. The data imprinting device according to claim 1, wherein said encoded symbol represents data including photographing parameter.

10. The data imprinting device according to claim 1, wherein said encoded symbol represents data including sound data.

11. The data imprinting device according to claim 1, further comprising a memory storing data to be imprinted, data stored in the memory being imprinted.

12. The data imprinting device according to claim 1, further comprising a reference code imprinting system that imprints a reference code representative of a feeding speed of the film when the encoded symbol is being imprinted.

13. The data imprinting device according to claim 12, wherein said reference code imprinting system includes a speed detection device that generates a signal corresponding to the feeding speed of the film.

14. The data imprinting device according to claim 1, wherein the data imprinted on the film includes sound data, wherein said data imprinting device includes a sound data generating system.

15. The data imprinting device according to claim 14, wherein said sound data generating system includes a microphone for picking up sound.

16. The data imprinting device according to claim 14, further comprising a memory in which the sound data generated by said sound data generating system is stored, the sound data stored in said memory being imprinted on said data imprinting area of the film.

17. The data imprinting device according to claim 16, further comprising a sound reproducing system that reproduces sound based on the sound data stored in said memory.

18. The data imprinting device according to claim 1, wherein said encoded symbol comprises a two-dimensional bar code.

19. The camera system according to claim 18, wherein said code reader reads and decodes the encoded symbol formed on a printed picture.

20. The data imprinting device for a camera according to claim 1, the camera having a normal mode in which an entire photographing frame is exposed to light forming an image of the object incident on a lens and an imprinting mode in which light from the lens is blocked from being incident onto said part of said photographing frame, said part of said photographing frame remaining unexposed and being exposable to light in accordance with data to be imprinted by said data imprinting system.

21. The data imprinting device according to claim 1, said light shielding system shielding at least one entire edge of the photographing frame such that an aspect ratio of the picture is changed, said entire edge extending in a film feed direction.

22. A camera system, comprising:
   a camera that photographs an object by forming an image of the object on a photographing frame defined on a photographing film, said camera including a data imprinting device including:
      a light shielding system that shields part of said photographing frame and prevents said part of said photographing frame from being exposed to light forming an image of the object on the photographing frame to define a data imprinting area in said part; and
      a data imprinting system that forms an optical image of encoded data on said data imprinting area in a form of an encoded symbol, when the light shielding system forms the data imprinting area; and
   a code reader that reads and decodes said encoded symbol formed on said film.

23. The camera system according to claim 22, the camera having a normal mode in which an entire photographing frame is exposed to light forming an image of the object incident on a lens and an imprinting mode in which part of the incident light from the lens is blocked.

24. The camera system according to claim 22, said light shielding system shielding at least one entire edge of the photographing frame such that an aspect ratio of said picture is changed, said entire edge extending in a film feed direction.

* * * * *